United States Patent
Toyomaki et al.

(10) Patent No.: US 8,699,884 B2
(45) Date of Patent: Apr. 15, 2014

(54) OPTICAL TRANSMISSION SYSTEM AND OPTICAL TRANSMISSION METHOD

(75) Inventors: Takashi Toyomaki, Kawasaki (JP); Motoyoshi Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 13/137,933

(22) Filed: Sep. 21, 2011

(65) Prior Publication Data

US 2012/0008957 A1 Jan. 12, 2012

Related U.S. Application Data

(63) Continuation of application No. PCT/JP2009/056580, filed on Mar. 30, 2009.

(51) Int. Cl.
*H04J 14/02* (2006.01)

(52) U.S. Cl.
USPC .................................. 398/83; 398/84; 398/85

(58) Field of Classification Search
USPC ...................................................... 398/83–85
See application file for complete search history.

(56) References Cited

U.S. PATENT DOCUMENTS

| | | | |
|---|---|---|---|
| 6,023,366 A | 2/2000 | Kinoshita | |
| 6,108,123 A | 8/2000 | Kinoshita | |
| 6,259,553 B1 | 7/2001 | Kinoshita | |
| 6,282,017 B1 | 8/2001 | Kinoshita | |
| 6,574,016 B1 | 6/2003 | Harley et al. | |
| 2001/0009465 A1* | 7/2001 | Uehara | 359/124 |
| 2001/0038488 A1 | 11/2001 | Kinoshita | |
| 2002/0024723 A1* | 2/2002 | Sekiya et al. | 359/337.1 |
| 2003/0099010 A1 | 5/2003 | Liu | |
| 2006/0147205 A1* | 7/2006 | Raddatz | 398/30 |

FOREIGN PATENT DOCUMENTS

| | | |
|---|---|---|
| JP | 5-130058 | 5/1993 |
| JP | 9-214428 | 8/1997 |
| JP | 9-247104 | 9/1997 |
| JP | 9-321701 | 12/1997 |
| JP | 10-229384 | 8/1998 |
| JP | 2000-165357 | 6/2000 |
| JP | 2001-230771 | 8/2001 |

(Continued)

OTHER PUBLICATIONS

International Search Report for PCT/JP2009/056580, mailed Apr. 21, 2009.

(Continued)

*Primary Examiner* — David C. Payne
*Assistant Examiner* — Tanya Motsinger
(74) *Attorney, Agent, or Firm* — Staas & Halsey LLP

(57) ABSTRACT

An optical transmission system includes a plurality of optical nodes that transmits wavelength multiplexing light including a plurality of signal light components having different wavelengths, wherein each of the optical nodes includes superimposed signal light generation circuit which superimposes a low frequency signal having a common frequency on a corresponding signal light component included in the wavelength multiplexing light; low frequency signal extraction circuit which extracts a low frequency signal having a frequency of a given range from a corresponding signal light component; and pass-through node number measurement circuit which measures, for each of the signal light components, a pass-through node number based on the frequency of the low frequency signal extracted by the low frequency signal extraction circuit, the pass-through node number being the number of optical nodes through which the signal light component has passed before being transmitted to a specific optical node.

3 Claims, 7 Drawing Sheets

(56) References Cited

FOREIGN PATENT DOCUMENTS

| | | |
|---|---|---|
| JP | 2002-141897 | 5/2002 |
| JP | 2002-311826 | 10/2002 |
| JP | 2003-188871 | 7/2004 |
| JP | 2005-45752 | 2/2005 |
| JP | 2005-340959 | 12/2005 |
| JP | 2006-510127 | 3/2006 |
| JP | 2007-122657 | 5/2007 |
| JP | 2007-195132 | 8/2007 |
| JP | 2008-141381 | 6/2008 |
| JP | 2009-543487 | 12/2009 |
| WO | 2008/006755 A1 | 1/2008 |

OTHER PUBLICATIONS

Japanese Office Action issued Aug. 21, 2012 in corresponding Japanese Patent Application No. 2008-171214.

Japanese Office Action mailed Oct. 8, 2013 for corresponding Japanese Patent Application No. 2012-233308.

* cited by examiner

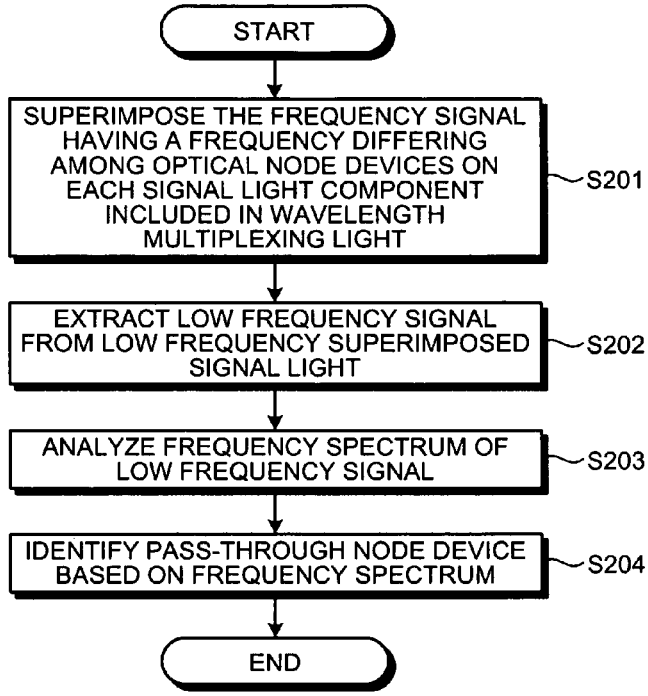
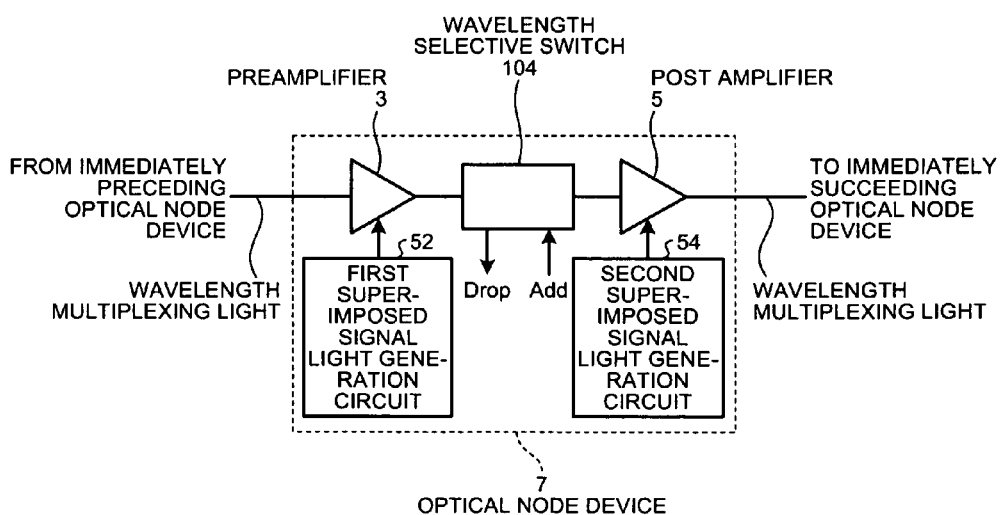

OPTICAL TRANSMISSION SYSTEM AND OPTICAL TRANSMISSION METHOD

CROSS-REFERENCE TO RELATED APPLICATION

This application is a continuation of International Application No. PCT/JP2009/056580, filed on Mar. 30, 2009, the entire contents of which are incorporated herein by reference.

FIELD

The embodiments discussed herein are directed to optical transmission systems and optical transmission methods, and for example, an optical transmission system and an optical transmission method that allow a user to promptly make judgment of whether wavelength multiplexing light can be transmitted when an optical transmission path or a type of optical node device is changed.

BACKGROUND

In an optical transmission system using wavelength division multiplexing (WDM), a plurality of optical node devices transmitting wavelength multiplexing light in which a plurality of light components having different wavelengths are multiplexed are connected to each other through an optical transmission path. In such an optical transmission system, an optical transmission path of wavelength multiplexing light or a type of optical node device may be changed (e.g., from an optical in-line amplifier (ILA) to an optical add-drop multiplexer (OADM)), for example, in response to changes in communication demands. The change of an optical transmission path of wavelength multiplexing light or a type of optical node device causes the number of times that wavelength multiplexing light passes through the optical node devices to vary.

When OADMs are used as the optical node devices included in the optical transmission system, filters, such as a wavelength selective switch (WSS) that can switch and output signal light having a certain wavelength into a certain direction and an arrayed waveguide grating (AWG) having a demultiplexing function outputting signal light components having different wavelengths, are often used in the OADMs. The wavelength band of wavelength multiplexing light is reduced every time the wavelength multiplexing light passes through such filters. Therefore, the number of times that wavelength multiplexing light passes through the optical node devices has a limit. If the number of times that wavelength multiplexing light passes through the optical node devices exceeds the limit, the wavelength multiplexing light can no longer be transmitted in the optical transmission system.

In a conventional optical transmission system, when an optical transmission path or a type of optical node device is changed, information for determining whether wavelength multiplexing light can be transmitted (hereinafter referred to as "transmission availability information"), such as the number of times that the wavelength multiplexing light passes through the optical node devices, is preliminarily stored in a control system that controls the system.

Patent Document 1: Japanese Laid-open Patent Publication No. 09-247104.

The conventional optical transmission system, however, has a problem in that it takes a time to determine whether wavelength multiplexing light can be transmitted when an optical transmission path or a type of optical node device is changed. In the conventional optical transmission system, each optical node device needs to refer to the control system for transmission availability information every time an optical transmission path or a type of optical node device changes. As a result, it takes a time for a user to confirm the transmission availability information. Therefore, it is difficult for a user to instantly judge whether wavelength multiplexing light can be transmitted. The problem also occurs, as illustrated in FIG. 12, in a case in which optical transmission paths are changed that connect a plurality of optical transmission systems having different control systems from each other.

SUMMARY

According to an aspect of an embodiment of the invention, an optical transmission system includes a plurality of optical nodes that transmits wavelength multiplexing light including a plurality of signal light components having different wavelengths; and an optical transmission path that optically couples the optical nodes with each other and through which the wavelength multiplexing light is transmitted, wherein each of the optical nodes includes: superimposed signal light generation circuit which superimposes a low frequency signal having a common frequency in the optical nodes on a corresponding signal light component included in the wavelength multiplexing light that is received; low frequency signal extraction circuit which extracts a low frequency signal having a frequency of a given range from a corresponding signal light component; and pass-through node number measurement circuit which measures, for each of the signal light components, a pass-through node number based on the frequency of the low frequency signal extracted by the low frequency signal extraction circuit, the pass-through node number being the number of optical nodes through which the signal light component has passed before being transmitted to a specific optical node.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a flowchart illustrating a processing procedure of optical transmission processing performed by the optical transmission system according to the second embodiment;

FIG. 9 is a functional block diagram illustrating a structure of an optical node device included in an optical transmission system according to a third embodiment;

DESCRIPTION OF EMBODIMENTS

Preferred embodiments of the present invention will be explained with reference to accompanying drawings. In the following embodiments, an exemplary optical transmission system according to the present invention is described in which a plurality of optical node devices are connected with each other in a grid arrangement through an optical transmission path. The optical transmission system, however, may include a plurality of optical node devices connected with each other in any arrangement such as a linear arrangement through an optical path.

[a] First Embodiment

Figure 1:
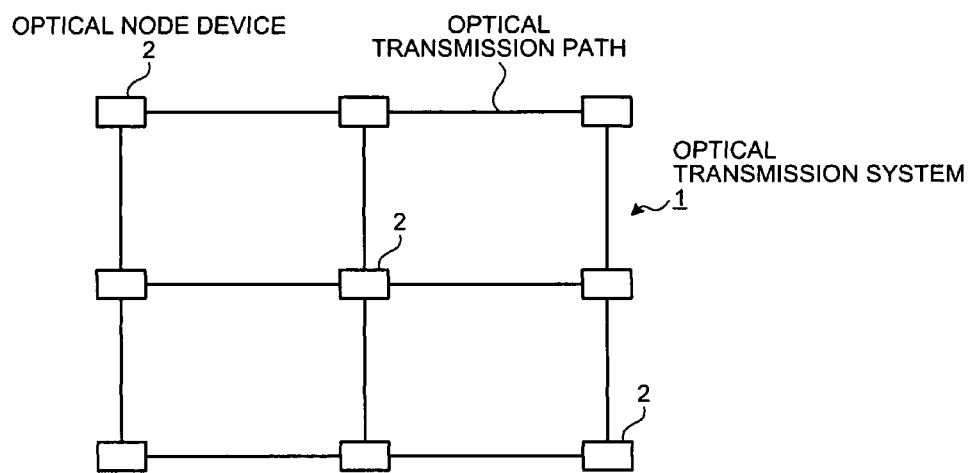
FIG. 1 is a schematic illustrating an overall structure of an optical transmission system according to a first embodiment.

First, a structure of an optical transmission system according to a first embodiment is described. FIG. 1 is a schematic illustrating an overall structure of the optical transmission system according to the first embodiment.

As illustrated in FIG. 1, an optical transmission system 1 according to the first embodiment includes a plurality of optical node devices 2 connected with each other in a grid arrangement through an optical path. The optical node device 2 transmits wavelength multiplexing light in which a plurality of signal light components having different wavelengths are multiplexed. The optical node device 2 is an optical add-drop multiplexer (OADM) that performs insertion (Add) or removal (Drop) of signal light having an allocated wavelength.

In the optical transmission system 1 according to the embodiment, each optical node device 2 performs amplitude modulation on each signal light component included in wavelength multiplexing light with a low frequency signal having a frequency that is the same (common in) as that of each optical node device 2, so that the low frequency signal is superimposed on each signal light component. The low frequency signal is expressed as $A \cdot \sin(\omega \cdot t)$, where A is a constant, $\omega$ is an angular velocity, and t is time. Each optical node device 2 extracts a low frequency signal having a frequency of a given range from each of a plurality of signal light components included in wavelength multiplexing light, and analyzes a frequency spectrum of the extracted low frequency signal.

A frequency spectrum analysis result on a low frequency signal analyzed by the optical node device 2 is described herein. When wavelength multiplexing light passes through a certain optical node device 2, the optical node device 2 superimposes the low frequency signal on the wavelength multiplexing light. Thus, the frequency spectrum of the low frequency signal is represented as $A \cdot \sin(\omega \cdot t)$. When wavelength multiplexing light passes through two optical node devices 2, each of the two optical node devices 2 superimposes the low frequency signal on wavelength multiplexing light. Thus, the frequency spectrum of the low frequency signal is represented as follows: $A \cdot \sin(\omega \cdot t) \times A \cdot \sin(\omega \cdot t) = B \cdot \cos(2\omega \cdot t) + C$, where B and C are constants. When wavelength multiplexing light passes through three optical node devices 3, each of the three optical node devices 2 superimposes the low frequency signal on wavelength multiplexing light. Thus, the frequency spectrum of the low frequency signal is represented as follows: $A \cdot \sin(\omega \cdot t) \times A \cdot \sin(\omega \cdot t) \times A \cdot \sin(\omega \cdot t) = D \cdot \sin(3\omega \cdot) + E \cdot \sin(\omega \cdot t)$, where D and E are constants. Accordingly, when wavelength multiplexing light passes through n optical node devices 2, the maximum of frequencies of signal components included in the frequency spectrum of the low frequency signal is $n \cdot \omega \cdot t$ (n is a natural number).

For each optical node device 2, a certain optical node device 2 measures the number of optical node device 2 through which wavelength multiplexing light has passed before being transmitted to the optical node device 2 (the number of pass-through nodes) based on the analyzed frequency spectrum. Specifically, the optical node device 2 identifies a signal component having the highest frequency out of the signal components included in the frequency spectrum, divides the frequency of the identified signal component by the frequency common in each optical node device 2 of the low frequency signal, and measures the number of pass-through nodes. For example, when wavelength multiplexing light passes through n optical node devices 2, the number of pass-through nodes is measured as n from the calculation of $n \cdot \omega \cdot t / (\omega \cdot t) = n$, because the frequency of the signal component having the highest frequency is $n \cdot \omega \cdot t$ as described above. The number of pass-through nodes is displayed on a given display provided to each optical node device 2, for example.

In this way, in the optical transmission system 1 according to the embodiment, each optical node device 2 superimposes the low frequency signal having a common frequency in each optical node device 2 on each signal light component included in wavelength multiplexing light. Each optical node device 2 extracts a low frequency signal having a frequency of a given range from each signal light component included in wavelength multiplexing light, and analyzes the frequency spectrum of the extracted low frequency signal. For each optical node device 2, a certain optical node device 2 measures the number of optical node device 2 through which wavelength multiplexing light has passed before being transmitted to the optical node device 2 (the number of pass-through nodes) based on the analyzed frequency spectrum. Accordingly, when an optical transmission path or a type of optical node device is changed, the number of pass-through nodes can be presented to a user, which eliminates the need for conventional processing of each optical node device referring to a control system for the number of pass-through nodes. As a result, a user can promptly judge whether wavelength multiplexing light can be transmitted.

Figure 2:
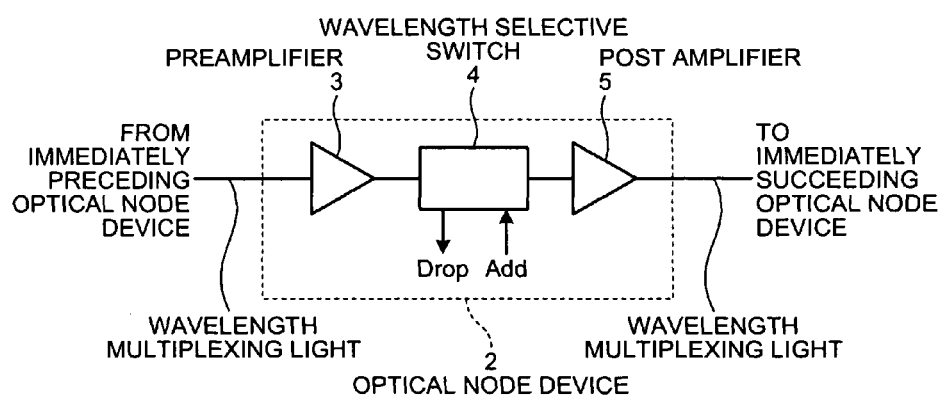
FIG. 2 is a functional block diagram illustrating a structure of an optical node device.

A specific structure of the optical node device 2 is described below. FIG. 2 is a functional block diagram illustrating a structure of the optical node device 2. As illustrated in FIG. 2, each optical node device 2 includes a preamplifier 3, a wavelength selective switch 4, and a post amplifier 5. The preamplifier 3 and the post amplifier 5 are optical amplifiers amplifying wavelength multiplexing light, and disposed upstream and downstream from the wavelength selective switch 4, respectively.

The wavelength selective switch 4 removes (Drop) signal light having a certain wavelength from wavelength multiplexing light received by the optical node device 2 or inserts (Add) signal light having a certain wavelength into the wavelength multiplexing light. The wavelength selective switch 4 selects signal light having a certain wavelength from wavelength multiplexing light and outputs signal light of the selected wavelength to any output port. Specifically, the wavelength selective switch 4 includes a spectroscopic device such as an arrayed waveguide grating (AWG) and a diffraction grating, and an optical switch device such as a microelectromechanical system (MEMS) mirror and a liquid crystal device. The spectroscopic device removes signal light having a certain wavelength from received wavelength multiplexing light. The output port is switched by operating the optical switch device in response to each wavelength of the removed signal light.

Figure 3:
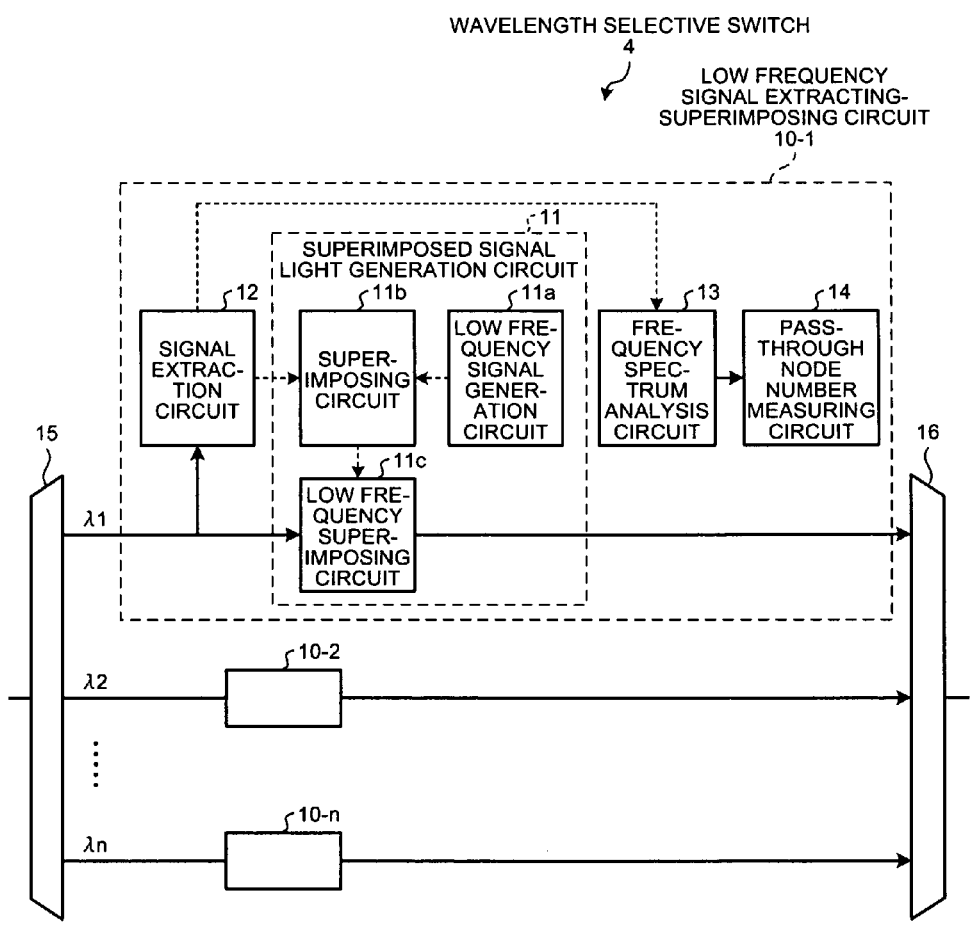
FIG. 3 is a functional block diagram illustrating a structure of a wavelength selective switch.

FIG. 3 is a functional block diagram illustrating a structure included in the wavelength selective switch 4 for extracting and superimposing a low frequency signal. The example of FIG. 3 only illustrates a structure relating to features of extracting and superimposing performed by the wavelength selective switch 4. A structure for multiple input or multiple output is not illustrated.

As illustrated in FIG. 3, the wavelength selective switch 4 includes a demultiplexer 15 and a multiplexer 16, and low frequency signal extracting-superimposing circuits 10-1 to 10-$n$. The low frequency signal extracting-superimposing circuits 10-1 to 10-$n$ respectively receive signal light components having wavelengths $\lambda 1$ to $\lambda n$ demultiplexed by the demultiplexer 15. Each of the low frequency signal extracting-superimposing circuits 10-1 to 10-$n$ includes a superimposed signal light generation circuit 11, a signal extraction circuit 12, a frequency spectrum analysis circuit 13, and a pass-through node number measurement circuit 14.

The superimposed signal light generation circuit 11 performs amplitude modulation on a corresponding signal light component included in wavelength multiplexing light with the low frequency signal having a common frequency in each optical node device 2, and produces wavelength multiplexing light in which the low frequency signal is superimposed on the corresponding signal light component (hereinafter referred to as "low frequency superimposed signal multiplexing light".

Specifically, the superimposed signal light generation circuit 11 includes a low frequency signal generation circuit 11$a$, a superimposing circuit 11$b$, and a low frequency superimposing circuit 11$c$. The low frequency signal generation circuit 11$a$ outputs the low frequency signal having a common frequency in each optical node device 2. The low frequency signal is represented as $A \sin(\omega \cdot t)$, where A is a constant, $\omega$ is an angular velocity, and t is time.

The superimposing circuit 11$b$ multiplies the low frequency signal extracted by the signal extraction circuit 12 by the low frequency signal $A \sin(\omega \cdot t)$ output from the low frequency signal generation circuit 11$a$ to obtain a superimposed low frequency signal, and outputs the superimposed low frequency signal. The low frequency superimposing circuit 11$c$ performs amplitude modulation on a signal light component $\lambda 1$ demultiplexed from the demultiplexer 15 with the superimposed low frequency signal to produce low frequency superimposed signal multiplexing light.

The signal extraction circuit 12 extracts a low frequency signal having a frequency of a given range from superimposed signal light produced by the superimposed signal light generation circuit 11 of the immediately preceding optical node device 2, and outputs the extracted low frequency signal to the frequency spectrum analysis circuit 13. For example, if wavelength multiplexing light has passed through two optical node devices 2, the signal extraction circuit 12 extracts a low frequency signal $A \sin(\omega \cdot t) \times A \sin(\omega \cdot t)$, and outputs the extracted low frequency signal to the frequency spectrum analysis circuit 13. Meanwhile, the superimposing circuit 11$b$ multiplies the low frequency signal extracted by the signal extraction circuit 12 by the low frequency signal $A \sin(\omega \cdot t)$ produced by the low frequency signal generation circuit 11$a$, and superimposes, on wavelength multiplexing light, a new low frequency signal $A \sin(\omega \cdot t) \times A \sin(\omega \cdot t) \times A \sin(\omega \cdot t)$ obtained by the multiplication.

The frequency spectrum analysis circuit 13 includes a spectrum analyzer. The frequency spectrum analysis circuit 13 analyzes the frequency spectrum of the low frequency signal extracted by the signal extraction circuit 12 and outputs the analyzed frequency spectrum to the pass-through node number measurement circuit 14.

The pass-through node number measurement circuit 14 measures the number of pass-through nodes that indicates the number of optical node devices 2 through which wavelength multiplexing light has passed before being transmitted to the specific optical node device 2 including the pass-through node number measurement circuit 14 based on the frequency spectrum analyzed by the frequency spectrum analysis circuit 13. Specifically, the pass-through node number measurement circuit 14 identifies the signal component having the highest frequency out of the signal components included in the frequency spectrum analyzed by the frequency spectrum analysis circuit 13, divides the frequency of the identified signal component by the frequency $\omega \cdot t$ common in each optical node device 2 of the low frequency signal $A \sin(\omega \cdot t)$, and measures the number of pass-through nodes. That is, when wavelength multiplexing light passes through n optical node devices 2, the number of pass-through nodes is measured as n from the calculation of $n\omega \cdot t/(\omega \cdot t)=n$, because the frequency of the signal component having the highest frequency is $n \cdot \omega \cdot t$.

Figure 4:
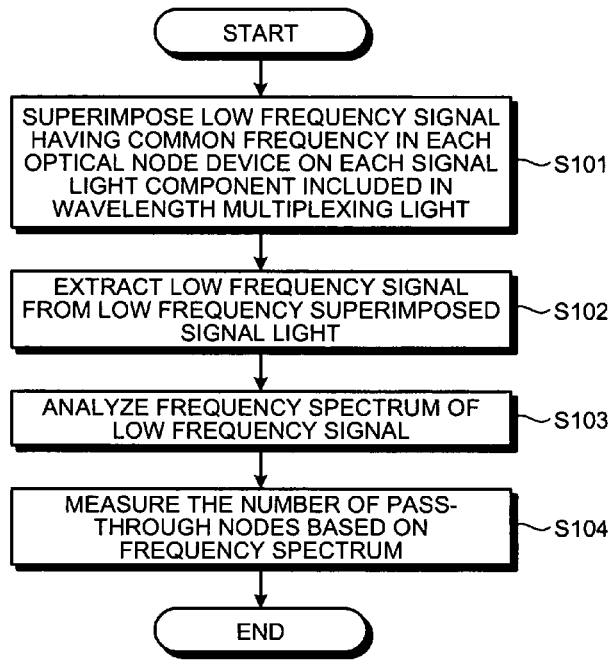
FIG. 4 is a flowchart illustrating a processing procedure of optical transmission processing performed by the optical transmission system according to the first embodiment.

Optical transmission processing performed by the optical transmission system 1 according to the first embodiment is described below. FIG. 4 is a flowchart illustrating a processing procedure of the optical transmission processing performed by the optical transmission system 1 according to the first embodiment.

As illustrated in FIG. 4, in each optical node device 2 included in the optical transmission system 1, the superimposed signal light generation circuit 11 of the wavelength selective switch 4 superimposes the low frequency signal $A \sin(\omega \cdot t)$ having a common frequency in each optical node device 2 on a corresponding signal light component included in wavelength multiplexing light (step S101). Each optical node device 2 transmits wavelength multiplexing light in which the low frequency signals are superimposed to the immediately succeeding optical node device 2 as low frequency superimposed signal multiplexing light.

In each optical node device 2, the signal extraction circuit 12 of the wavelength selective switch 4 extracts a low frequency signal having a frequency of a given range from low frequency superimposed signal light produced by the superimposed signal light generation circuit 11 of the immediately preceding optical node device 2 (step S102). The signal extraction circuit 12 outputs the extracted low frequency signal to the frequency spectrum analysis circuit 13.

Then, the frequency spectrum analysis circuit 13 analyzes the frequency spectrum of the low frequency signal extracted by the signal extraction circuit 12 (step S103). Then, the pass-through node number measurement circuit 14 measures the number of pass-through nodes based on the frequency spectrum analyzed by the frequency spectrum analysis circuit 13 (step S104). The number of pass-through nodes that is measured is displayed on a given display provided to the optical node device 2, for example.

As described above, in the optical transmission system 1 according to the first embodiment, each optical node device 2 superimposes the low frequency signal having the common frequency in each optical node device 2 on the signal light components included in wavelength multiplexing light. Each optical node device 2 extracts a low frequency signal having a frequency of a given range from low frequency superimposed signal light, and analyzes the frequency spectrum of the extracted low frequency signal. Each optical node device 2 measures the number of pass-through nodes based on the analyzed frequency spectrum. Accordingly, when an optical transmission path or a type of optical node device is changed, the number of pass-through nodes can be presented to a user, which eliminates the need for conventional processing of each optical node device referring to a control system for the number of pass-through nodes. As a result, a user can promptly judge whether wavelength multiplexing light can be transmitted.

[b] Second Embodiment

In the first embodiment, the example is described in which the low frequency signal is superimposed on each signal light component included in wavelength multiplexing light, and the frequency spectrum of the low frequency signal that is superimposed is analyzed, and the number of pass-through nodes is measured. In a second embodiment, an optical transmission system is described in which a low frequency signal is superimposed on each signal light component included in wavelength multiplexing light, a frequency spectrum of the low frequency signal that is superimposed is analyzed, and a pass-through optical node device is identified that indicates an optical node device through which wavelength multiplexing light has passed before being transmitted to a specific optical node device.

Figure 5:
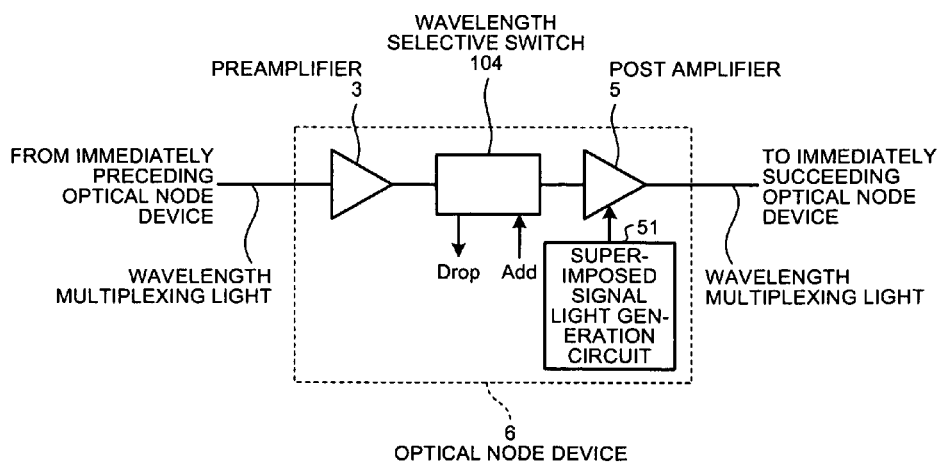
FIG. 5 is a functional block diagram illustrating a structure of an optical node device included in an optical transmission system according to a second embodiment.

A structure of an optical node device 6 included in the optical transmission system according to the second embodiment is described. FIG. 5 is a functional block diagram illustrating the structure of the optical node device 6 included in the optical transmission system according to the second embodiment. In the following description, the units having the same functions as the first embodiment are denoted by the same reference numerals, and the detailed descriptions thereof are omitted. The overall structure of the optical transmission system according to the second embodiment is the same as the overall structure illustrated in FIG. 1. The description thereof is, thus, omitted herein.

As illustrated in FIG. 5, each optical node device 6 includes a wavelength selective switch 104 instead of the wavelength selective switch 4 included in the optical node device 2 illustrated in FIG. 2, and a superimposed signal light generation circuit 51 as a new circuit.

The wavelength selective switch 104 removes (Drop) signal light having a certain wavelength from wavelength multiplexing light received by the optical node device 6 or inserts (Add) signal light having a certain wavelength into the wavelength multiplexing light. The wavelength selective switch 104 selects signal light having a certain wavelength from wavelength multiplexing light and outputs signal light of the selected wavelength to any output port. Specifically, the wavelength selection switch 104 includes a spectroscopic device such as an arrayed waveguide grating (AWG) and a diffraction grating, and an optical switch device such as a microelectromechanical system (MEMS) mirror and a liquid crystal device. The spectroscopic device removes signal light having a certain wavelength from received wavelength multiplexing light. The output port is switched by operating the optical switch device in response to each wavelength of the removed signal light.

The superimposed signal light generation circuit 51 produces wavelength multiplexing light (hereinafter referred to as "superimposed signal light") obtained by superimposing a low frequency signal having a frequency differing among the optical node devices 6 on wavelength multiplexing light. For example, when the optical transmission system of the second embodiment includes nine optical node devices 6: optical node device (1) to optical node device (9), the superimposed signal light generation circuit 51 superimposes a low frequency signal having a frequency $\alpha$ (N) on wavelength multiplexing light passing through an optical node device (N) (N=1 to 9, and the value of $\alpha$ (N) differs from different N).

In the example illustrated in FIG. 5, the superimposed signal light generation circuit 51 outputs a low frequency signal having a frequency differing among the optical node devices 6 to the post amplifier 5, in which the low frequency signal is superimposed on wavelength multiplexing light. Consequently, the superimposed signal light generation circuit 51 can superimpose the low frequency signal on the signal light components of all of the wavelengths included in wavelength multiplexing light at once.

Figure 6:
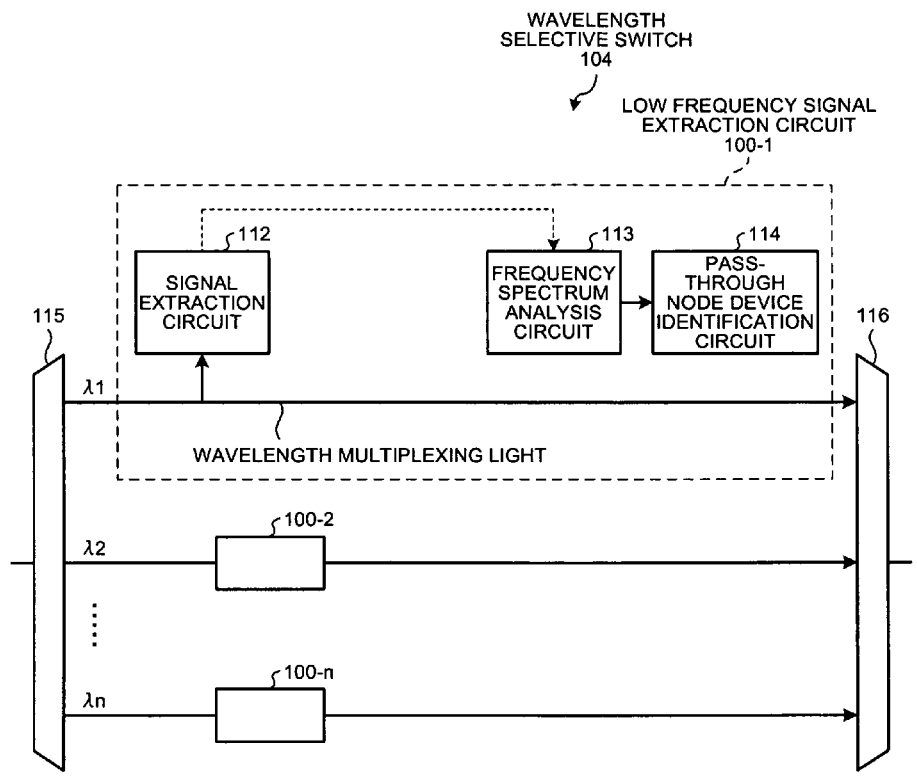
FIG. 6 is a functional block diagram illustrating a structure of a wavelength selective switch.

FIG. 6 is a functional block diagram illustrating a structure included in the wavelength selective switch 104 for extracting and superimposing of a low frequency signal. The example of FIG. 6 only illustrates a structure relating to features of extracting and superimposing performed by the wavelength selective switch 104. A structure for multiple input or multiple output is not illustrated.

As illustrated in FIG. 6, the wavelength selective switch 104 includes a demultiplexer 115 and a multiplexer 116, and low frequency extraction circuits 100-1 to 100-$n$. The low frequency signal extraction circuits 100-1 to 100-$n$ respectively receive signal light components having wavelengths $\lambda 1$ to $\lambda n$ demultiplexed by the demultiplexer 115. Each of the low frequency signal extraction circuits 100-1 to 100-$n$ includes a signal extraction circuit 112, a frequency spectrum analysis circuit 113, and a pass-through node device identification circuit 114.

The signal extraction circuit 112 extracts a low frequency signal having a frequency of a given range from superimposed signal light produced by the superimposed signal light generation circuit 51 of the immediately preceding optical node device 6, and outputs the extracted low frequency signal to the frequency spectrum analysis circuit 113.

The frequency spectrum analysis circuit 113 includes a spectrum analyzer. The frequency spectrum analysis circuit 13 analyzes the frequency spectrum of the low frequency signal extracted by the signal extraction circuit 112 and outputs the analyzed frequency spectrum to the pass-through node device identification circuit 114.

The pass-through node device identification circuit 114 identifies the pass-through optical node device that indicates the optical node device 6 through which wavelength multiplexing light has passed before being transmitted to the specific optical node device 6 including the pass-through node device identification circuit 114 based on the frequency spectrum analyzed by the frequency spectrum analysis circuit 113. Specifically, the pass-through node device identification circuit 114 identifies the pass-through node device by discerning frequencies of low frequency signal included in the frequency spectrum analyzed by the frequency spectrum analysis circuit 113.

Figure 7:
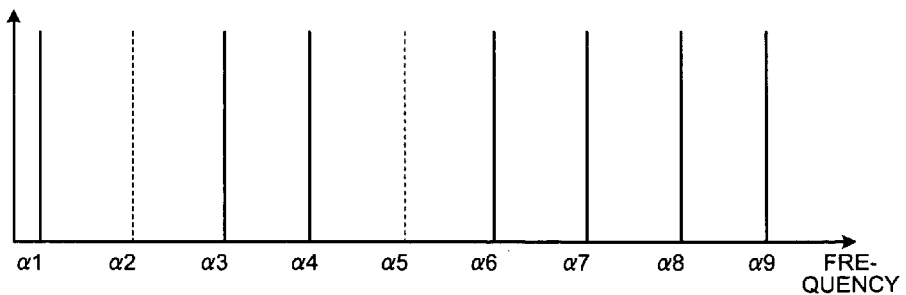
FIG. 7 is a schematic illustrating an example of a frequency spectrum analyzed by a frequency spectrum analysis circuit.

A technique in which the pass-through node device identification circuit 114 identifies a pass-through node device is described below. FIG. 7 is a schematic illustrating an example of the frequency spectrum analyzed by the frequency spectrum analysis circuit 113. The frequency spectrum illustrated in FIG. 7 is analyzed by the frequency spectrum analysis circuit 113 of an optical node device (10) when the optical transmission system of the embodiment includes ten optical node devices 6: an optical node device (1) to the optical node device (10). The superimposed signal light generation circuit 51 superimposes a low frequency signal having a frequency α (N) on wavelength multiplexing light passing through an optical node device (N) (N=1 to 9, and the value of α (N) differs from different N).

As illustrated in FIG. 7, the frequency spectrum analyzed by the frequency spectrum analysis circuit 113 includes low frequency signals having frequencies α1, α3, α4, and α6 to α9. The frequency spectrum, however, does not include low frequency signals having frequencies α2 and α5. In this case, the pass-through node device identification circuit 114 identifies the optical node devices (1), (3), (4), and (6) to (9) as the pass-through node devices out of the nine optical node devices 6 by discerning the frequencies α1, α3, α4, and α6 to α9 of the low frequency signals included in the frequency spectrum. Because the low frequency signals having the frequencies α2 and α5 are not included in the frequency spectrum, it can be seen that wavelength multiplexing light having reached the optical node device (10) had not passed through the optical node devices (2) and (5).

Optical transmission processing performed by the optical transmission system according to the second embodiment is described below. FIG. 8 is a flowchart illustrating a processing procedure of the optical transmission processing performed by the optical transmission system according to the second embodiment.

As illustrated in FIG. 8, in each optical node device 6 included in the optical transmission system, the superimposed signal light generation circuit 51 superimposes the low frequency signal having a frequency differing among the optical node devices 6 on each signal light component included in wavelength multiplexing light (step S201). Each optical node device 6 transmits wavelength multiplexing light in which the low frequency signals are superimposed to the immediately succeeding optical node device 6 as superimposed signal light.

In each optical node device 6, the signal extraction circuit 112 of the wavelength selective switch 104 extracts a low frequency signal having a frequency of a given range from low frequency superimposed signal light produced by the superimposed signal light generation circuit 51 of the immediately preceding optical node device 6 (step S202). The signal extraction circuit 112 outputs the extracted low frequency signal to the frequency spectrum analysis circuit 113.

Then, the frequency spectrum analysis circuit 113 analyzes the frequency spectrum of the low frequency signal extracted by the signal extraction circuit 112 (step S203). Then, the pass-through node device identification circuit 114 identifies the pass-through node device based on the frequency spectrum analyzed by the frequency spectrum analysis circuit 113 (step S204). The pass-through node device is displayed on a given display provided to the optical node device 6, for example.

As described above, in the optical transmission system according to the second embodiment, each optical node device 6 superimposes the low frequency signal having a frequency differing among the optical node devices 6 on each signal light component included in wavelength multiplexing light. Each optical node device 6 extracts a low frequency signal having a frequency of a given range from superimposed signal light, and analyzes the frequency spectrum of the extracted low frequency signal. Each optical node device 6 identifies the pass-through node device based on the analyzed frequency spectrum. Accordingly, when an optical transmission path or a type of optical node device is changed, the pass-through node device can be presented to a user. Information of the pass-through node device is effective for examining an alternative path when a traffic bias in the whole optical transmission system or a transmission failure occurs.

[c] Third Embodiment

In the second embodiment, the example is described in which the low frequency signal is superimposed on each signal light component included in wavelength multiplexing light, the frequency spectrum of the low frequency signal that is superimposed is analyzed, and the pass-through optical node device is identified. In a third embodiment, an optical transmission system is described in which pass-through optical node devices are identified and, out of the pass-through optical node devices, an insertion node device is identified that indicates an optical node device by which signal light having a certain wavelength is inserted into wavelength multiplexing light.

A structure of an optical node device 7 included in the optical transmission system according to the third embodiment is described. FIG. 9 is a functional block diagram illustrating the structure of the optical node device 7 included in the optical transmission system according to the third embodiment. In the following description, the circuits having the same functions as the second embodiment are denoted by the same reference numerals, and the detailed descriptions thereof are omitted. The overall structure of the optical transmission system according to the third embodiment is the same as the overall structure illustrated in FIG. 1. The description thereof is, thus, omitted herein.

As illustrated in FIG. 9, each optical node device 7 includes a first superimposed signal light generation circuit 52 instead of the superimposed signal light generation circuit 51 included in the optical node device 6 illustrated in FIG. 5, and a second superimposed signal light generation circuit 54 as a new circuit.

The first superimposed signal light generation circuit 52 superimposes a first low frequency signal having a frequency differing among the optical node devices 7 on each signal light included in wavelength multiplexing light upstream from the wavelength selective switch 104 that performs removal (Drop) or insertion (Add). For example, when the optical transmission system of the third embodiment includes nine optical node devices 7: an optical node device (1) to an optical node device (9), the first superimposed signal light generation circuit 52 superimposes, as the first low frequency signal, a low frequency signal having a frequency α (N) on wavelength multiplexing light passing through an optical node device (N) (N=1 to 9, and the value of α (N) differs from different N).

In the example illustrated in FIG. 9, the first superimposed signal light generation circuit 52 outputs the first low frequency signal to the preamplifier 3, in which the first low frequency signal is superimposed on wavelength multiplexing light. Consequently, the first superimposed signal light generation circuit 52 can superimpose the first low frequency signal on the signal light components of all of the wavelengths included in wavelength multiplexing light at once.

The second superimposed signal light generation circuit 54 superimposes a second low frequency signal having a frequency differing among the optical node devices 7 and from that of the first low frequency signal on each signal light component included in wavelength multiplexing light downstream from the wavelength selective switch 104 that performs removal (Drop) or insertion (Add). For example, when the optical transmission system of the embodiment includes nine optical node devices 7: the optical node device (1) to the optical node device (9), the first superimposed signal light generation circuit 52 superimposes, as the first low frequency signal, a low frequency signal having the frequency α (N) on each signal light component included in wavelength multiplexing light passing through the optical node device (N) (N=1 to 9, and the value of α (N) differs from different N). On the other hand, the second superimposed signal light generation circuit 54 superimposes, as the second low frequency signal, a low frequency signal having a frequency β (N) on each signal light component included in wavelength multiplexing light passing through the optical node device (N) (N=1 to 9, the value of β (N) differs from different N, and α (N)≠β (N)).

In the example illustrated in FIG. 9, the second superimposed signal light generation circuit 54 outputs the second low frequency signal to the post amplifier 5, in which the second low frequency signal is superimposed on wavelength multiplexing light. Consequently, the second superimposed signal light generation circuit 54 can superimpose the second low frequency signal on the signal light components of all of the wavelengths included in wavelength multiplexing light at once.

The pass-through node device identification circuit 114 of the wavelength selective switch 104 (refer to FIG. 6) identifies pass-through node devices based on the frequency spectrum analyzed by the frequency spectrum analysis circuit 113, and identifies an insertion node device out of the optical node devices 7 included in the pass-through node devices.

Figure 10:
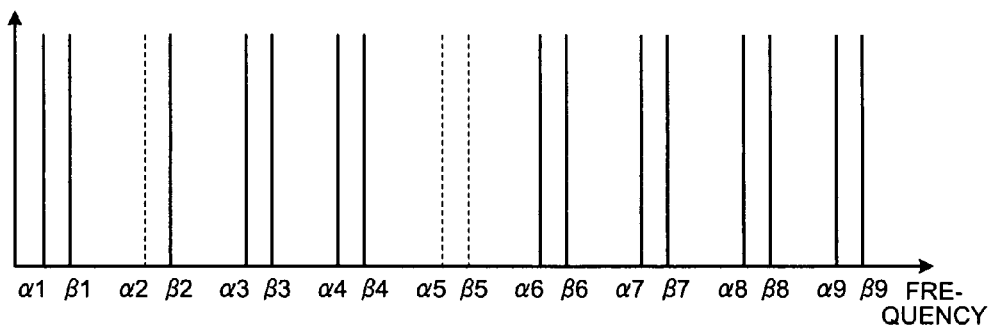
FIG. 10 is a schematic illustrating an example of a frequency spectrum analyzed by a frequency spectrum analysis circuit.

A technique in which the pass-through node device identification circuit 114 identifies pass-through node devices and an insertion node device is described below. FIG. 10 is a schematic illustrating an example of the frequency spectrum analyzed by the frequency spectrum analysis circuit 113. The frequency spectrum illustrated in FIG. 10 is analyzed by the frequency spectrum analysis circuit 113 of an optical node device (10) when the optical transmission system of the embodiment includes ten optical node devices 7: the optical node device (1) to the optical node device (10). The first superimposed signal light generation circuit 52 superimposes, as the first low frequency signal, the low frequency signal having the frequency α (N) on wavelength multiplexing light passing through the optical node device (N) (N=1 to 9, and the value of α (N) differs from different N). The second superimposed signal light generation circuit 54 superimposes, as the second low frequency signal, the low frequency signal having the frequency β (N) on wavelength multiplexing light passing through the optical node device (N) (N=1 to 9. the value of β (N) differs from different N, and α (N)≠β (N)).

As illustrated in FIG. 10, the frequency spectrum analyzed by the frequency spectrum analysis circuit 113 includes the first low frequency signals having frequencies α1, α3, α4, and α6 to α9 and the second low frequency signals having frequencies β1, β2, β3, β4, and β6 to β9. The frequency spectrum, however, does not include the first low frequency signals having frequencies α2 and α5, and the second low frequency signal having a frequency β5. In this case, the pass-through node device identification circuit 114 identifies the optical node devices (1), (2), (3), (4), and (6) to (9) as the pass-through node devices out of nine optical node devices 7 by discerning the frequencies α1, β1, β2, α3, β3, α4, β4, α6, β6, α7, β7, α8, β8, α9, and β9.

The pass-through node device identification circuit 114 identifies the optical node device (2) as the insertion node device out of the optical node devices included in the pass-through node devices by discerning the frequency β2 of the second low frequency signal included in the frequency spectrum.

As described above, the first superimposed signal light generation circuit 52 superimposes the first low frequency signal on each signal light included in wavelength multiplexing light upstream from the wavelength selective switch 104 performing removal or insertion. On the other hand, the second superimposed signal light generation circuit 54 superimposes the second low frequency signal on an signal light included in wavelength multiplexing light downstream from the wavelength selective switch 104 performing removal or insertion. Because of this arrangement, a signal light component having a certain wavelength that has been inserted by the wavelength selective switch 104 will include the second low frequency signal only, and not include the first low frequency signal. Therefore, the pass-through node device identification circuit 114 can identify the optical node device (2) as the insertion node device out of the optical node devices included in the pass-through node devices by discerning the frequency β2 of the second low frequency signal included in the frequency spectrum.

Figure 11:
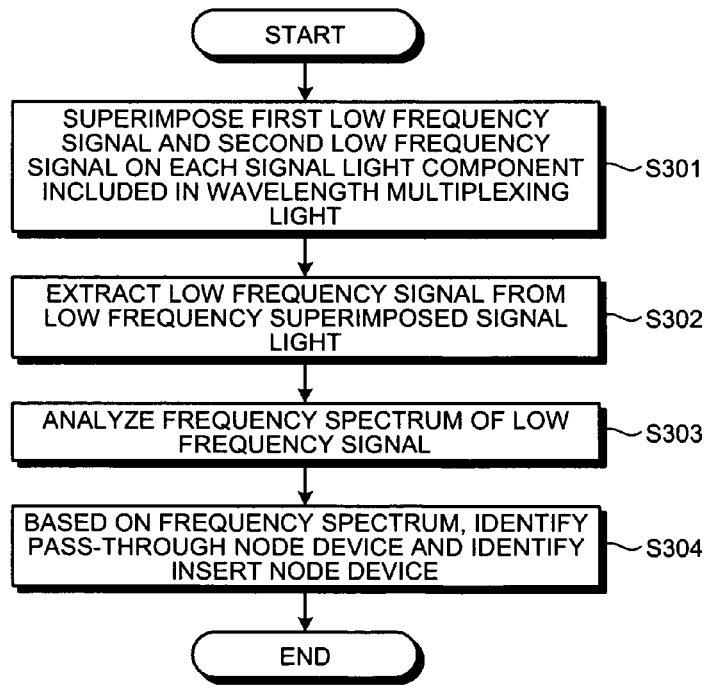
FIG. 11 is a flowchart illustrating a processing procedure of optical transmission processing performed by the optical transmission system according to the third embodiment.
Figure 12:
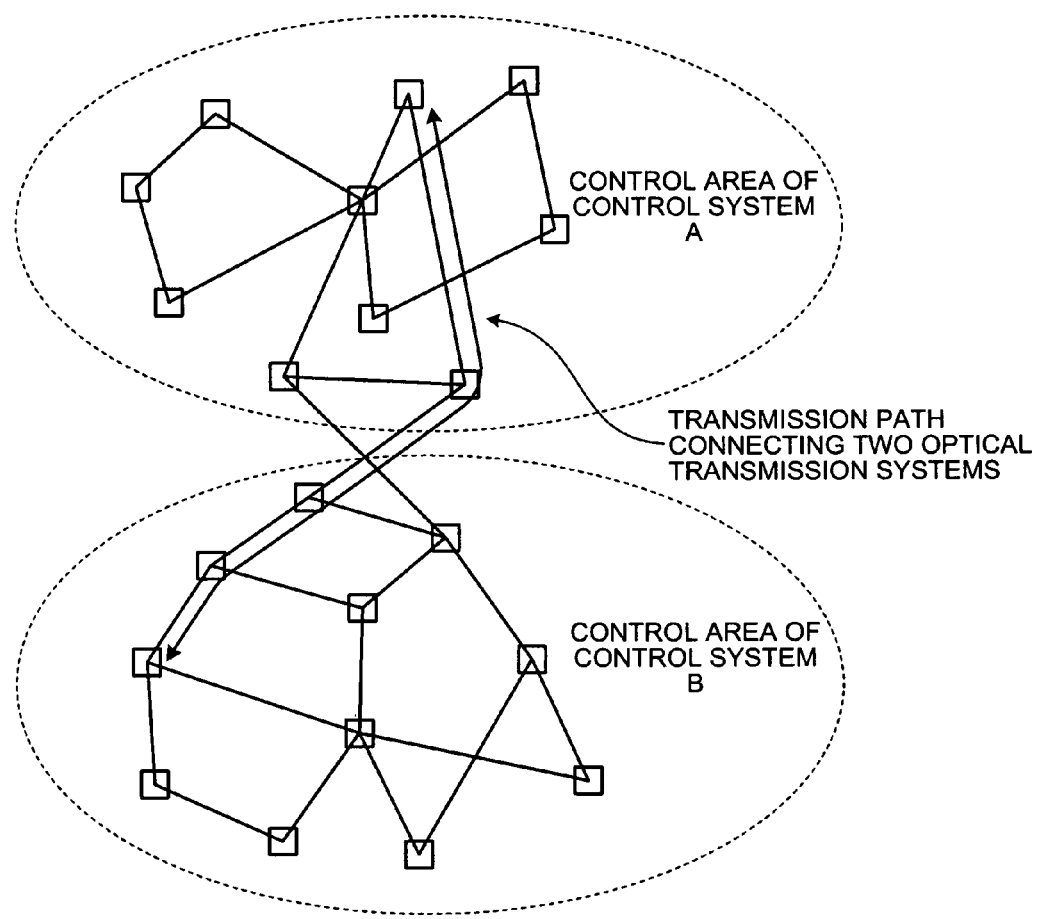
FIG. 12 is a schematic to explain a problem that occurs when optical transmission paths that connect a plurality of optical transmission systems having different control systems from each other are changed.

Optical transmission processing performed by the optical transmission system according to the third embodiment is described below. FIG. 11 is a flowchart illustrating a processing procedure of the optical transmission processing performed by the optical transmission system according to the third embodiment.

As illustrated in FIG. 11, in each optical node device 7 included in the optical transmission system, the first superimposed signal light generation circuit 52 superimposes the first low frequency signal having a frequency differing among the optical node devices 7 on each signal light included in wavelength multiplexing light upstream from the wavelength selective switch 104 performing removal or insertion. The second superimposed signal light generation circuit 54 superimposes the second low frequency signal having a frequency differing among the optical node devices 7 and from that of the first low frequency signal on each signal light included in wavelength multiplexing light downstream from the wavelength selective switch 104 performing removal or insertion (step S301). Each optical node device 7 transmits wavelength multiplexing light in which the low frequency signals are superimposed to the immediately succeeding optical node device 7 as superimposed signal light.

In each optical node device 7, the signal extraction circuit 112 of the wavelength selective switch 104 extracts a low frequency signal having a frequency of a given range from low frequency superimposed signal light produced by the first superimposed signal light generation circuit 52 and the second superimposed signal light generation circuit 54 of the immediately preceding optical node device 7 (step S302). The signal extraction circuit 112 outputs the extracted low frequency signal to the frequency spectrum analysis circuit 113.

Then, the frequency spectrum analysis circuit 113 analyzes the frequency spectrum of the low frequency signal extracted by the signal extraction circuit 112 (step S303). Then, the pass-through node device identification circuit 114 identifies the pass-through node devices based on the frequency spectrum analyzed by the frequency spectrum analysis circuit 113 and identifies an insertion node device (step S304). The pass-through node devices and the insertion node device are displayed on a given display provided to the optical node device 7, for example.

As described above, in the optical transmission system according to the third embodiment, each optical node device 7 superimposes the first low frequency signal having a frequency differing among the optical node devices 7 on each signal light component included in wavelength multiplexing light upstream from the wavelength selective switch 104 performing removal or insertion. Each optical node device 7 also superimposes the second low frequency signal having a frequency differing among the optical node devices 7 and from that of the first low frequency signal on each signal light included in wavelength multiplexing light downstream from the wavelength selective switch 104 performing removal or insertion. Each optical node device 7 extracts a low frequency signal having a frequency of a given range from superimposed signal light, and analyzes the frequency spectrum of the extracted low frequency signal. Each optical node device 7 identifies the pass-through node devices based on the analyzed frequency spectrum and identifies the insertion node device. Accordingly, when an optical transmission path or a type of optical node device is changed, the insertion node device can be presented to a user in addition to the pass-through node devices. Information of the insertion node device is effective for examining an alternative path when a traffic bias in the whole optical transmission system or a transmission failure occurs.

The present invention allows a user to promptly make judgment of whether wavelength multiplexing light can be transmitted when an optical transmission path or a type of optical node device is changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
a plurality of optical nodes that transmit wavelength multiplexing light including a plurality of signal light components having different wavelengths; and
an optical transmission path that optically couples the plurality of optical nodes and through which the wavelength multiplexing light is transmitted,
wherein each optical node includes:
a superimposed signal light generation circuit that superimposes a low frequency signal having a common frequency in the optical node on a corresponding signal light component included in the wavelength multiplexing light that is received;
a signal extraction circuit that extracts a signal having a frequency of a given range from a corresponding signal light component; and
a pass-through node number measurement circuit that measures, for each of the signal light components, a pass-through node number based on the frequency of the signal extracted by the signal extraction circuit, the pass-through node number being a number of optical nodes through which the signal light component has passed before being transmitted to a specific optical node,
wherein the pass-through node number measurement circuit identifies a signal component having a highest frequency out of signal components included in the signal extracted by the signal extraction circuit, divides the frequency of the identified signal component by the common frequency in the optical nodes of the signal, and measures the pass-through node number.

2. An optical transmission system comprising:
a plurality of optical nodes that transmit wavelength multiplexing light including a plurality of signal light components having different wavelengths; and
an optical transmission path that connects the plurality of optical nodes, through which the wavelength multiplexing light is transmitted,
wherein each optical node includes:
a superimposed signal light generation circuit that superimposes a signal having a frequency differing among optical nodes on a corresponding signal light component included in the wavelength multiplexing light that is received;
a signal extraction circuit that extracts a signal having a frequency of a given range from the corresponding signal light component; and
a pass-through node identification circuit that identifies, for each of the signal light components, a pass-through optical node based on the frequency of the signal extracted by the corresponding signal extraction circuit, the pass-through optical node being an optical node through which the signal light component has passed before being transmitted to a specific optical node, wherein
each of the optical nodes is an optical add-drop multiplexer (OADM) that removes a signal light component having a certain wavelength from the wavelength multiplexing light or inserts a signal light component having a certain wavelength into the wavelength multiplexing light, and
the superimposed signal light generation circuit superimposes a first signal having a frequency differing among the optical nodes on each signal light component upstream from a location at which the removal or the insertion is performed, and superimposes a second signal differing among the optical nodes and from the first signal on each signal light component downstream from the location at which the removal or the insertion is performed.

3. An optical transmission method performed by an optical transmission system including a plurality of optical nodes, comprising:
superimposing a common frequency signal having a common frequency in the optical nodes on each of a plurality of signal light components included in a wavelength multiplexing light that is received;
extracting a signal having a frequency of a given range from each of the signal light components; and
measuring a pass-through node number, for each of the signal light components, based on the frequency of the signal extracted at the extracting, the pass-through node number being a number of optical nodes through which the signal light component has passed before being transmitted to a specific optical node, and
wherein the measuring includes identifying a signal component having a highest frequency out of signal components included in the signal extracted at the extracting, dividing the frequency of the identified signal component by the common frequency in the optical nodes of the common frequency signal, and measuring the pass-through node number.

* * * * *